(12) United States Patent
Marchitto

(10) Patent No.: US 8,629,590 B2
(45) Date of Patent: Jan. 14, 2014

(54) ROTOR FOR ELECTRIC MOTOR WITH SLOTS FOR AIRFLOW

(75) Inventor: Luciano Marchitto, Pianezza (IT)

(73) Assignee: Gate S.R.L., Turin (IT)

( * ) Notice: Subject to any disclaimer, the term of this patent is extended or adjusted under 35 U.S.C. 154(b) by 87 days.

(21) Appl. No.: 13/007,291

(22) Filed: Jan. 14, 2011

(65) Prior Publication Data

US 2011/0175494 A1 Jul. 21, 2011

(30) Foreign Application Priority Data

Jan. 15, 2010 (IT) .............................. TO2010A0022

(51) Int. Cl.
*H02K 9/00* (2006.01)
*H02K 11/00* (2006.01)
*H02K 5/00* (2006.01)
*H02K 1/22* (2006.01)

(52) U.S. Cl.
USPC .............. 310/62; 310/67 R; 310/89; 310/266

(58) Field of Classification Search
USPC .......................... 310/862, 67 R, 265, 89, 266
See application file for complete search history.

(56) References Cited

U.S. PATENT DOCUMENTS

| | | | | |
|---|---|---|---|---|
| 3,254,395 | A * | 6/1966 | Baehr | 29/890.01 |
| 6,815,849 | B2 * | 11/2004 | Serizawa et al. | 310/62 |
| 2006/0119214 | A1 * | 6/2006 | Park | 310/265 |
| 2009/0107186 | A1 * | 4/2009 | Jun et al. | 68/140 |
| 2010/0133932 | A1 * | 6/2010 | Zhang | 310/59 |

* cited by examiner

*Primary Examiner* — Tran Nguyen
*Assistant Examiner* — Jose Gonzalez Quinones
(74) *Attorney, Agent, or Firm* — Muncy, Geissler, Olds & Lowe, PLLC

(57) ABSTRACT

A rotor of an electric motor has a carrier structure including a disc portion to which is centrally connected a shaft, and the periphery of which is joined to an essentially cylindrical annular skirt portion which in use extends coaxially around the stator. The disc portion has a plurality of slots between which there is defined a corresponding plurality of spokes. At least some of the spokes have, in a circumferential direction, a transverse cross-section shaped in a manner to induce, at least when the rotor rotates in one direction, an at least approximately axial air flow through corresponding slots.

11 Claims, 3 Drawing Sheets

ROTOR FOR ELECTRIC MOTOR WITH SLOTS FOR AIRFLOW

CROSS REFERENCE TO RELATED APPLICATIONS

This non-provisional patent application claims priority under 35 U.S.C. §119(a) from Patent Application No. TO2010A000022 filed in Italy on Jan. 15, 2010.

FIELD OF THE INVENTION

This invention relates to an electric motor and in particular, to a rotor for an electric motor and an electric motor having such a rotor.

BACKGROUND OF THE INVENTION

The present invention has particular application in an electric motor of the type with an external rotor and an internal stator, in particular a permanent magnet direct-current brushless type motor. More specifically the invention is directed to a rotor of the type comprising a carrier structure including a disc portion to which is centrally connected a hub, and the periphery of which is joined to a basically annular cylindrical skirt portion which in use extends coaxially around the stator.

This type of rotor for a brushless D.C. motor typically carries, in the annular skirt part, a plurality of permanent magnets, and an associated structure for linking up the magnetic flux produced by these magnets.

In a brushless electric motor of this construction, the stator has a magnetically conducting structure in a star geometry, with a plurality of radial expansions or teeth, supporting coils that form the stator windings. Typically at least one card or board containing the components of an electronic control circuit are attached to the stator, usually on the opposite side from the rotor. These components generate heat during use and add to the heat generated by the stator windings.

There is a desire to provide a rotor of the type specified above, capable of contributing significantly to the cooling of the stator windings and of the electronic control circuit connected to the motor.

SUMMARY OF THE INVENTION

Accordingly, in one aspect thereof, the present invention provides a rotor for an electric motor of the type with an internal stator, the rotor comprising a carrier structure including a disc portion to which is centrally connected a shaft, and the periphery of which is joined to an essentially cylindrical annular skirt portion which in use extends coaxially around the stator; wherein the disc portion of the carrier structure has a plurality of slots between which there is defined a corresponding plurality of spokes, at least some of which have, in a circumferential direction, a transverse cross-section shaped in a manner such to induce, at least when the rotor rotates in one sense, an at least approximately axial air flow through corresponding slots.

Preferably, the slots of the disc portion are essentially radial.

Preferably, at least some of the spokes have, in a circumferential direction, a transverse cross-section having an essentially planar external surface, and an internal surface which has a symmetrical profile which, proceeding from one end to the other, is concave, then convex, then once again concave, like a double-wing profile.

Alternatively, at least some of the spokes have, in a circumferential direction, a transverse cross-section having an essentially planar internal surface, and an external surface which has a symmetrical profile which, proceeding from one end to the other, is concave, then convex, then once again concave, essentially like a double-wing profile disposed upside down.

Preferably, the spokes have, in a circumferential direction, alternately an aerodynamically inactive cross-section and an aerodynamically active cross-section.

Preferably, the spokes having, in a circumferential direction, an aerodynamically active cross-section, have transverse-sections shaped as wing profiles having the same orientation.

Preferably, the spokes having, in a circumferential direction, an aerodynamically active cross-section, have crescent shaped transverse-sections.

According to a second aspect, the present invention provides an electric motor having an outer rotor and an inner stator, wherein the rotor is as defined in any one of the preceding claims.

Preferably, the motor is a permanent magnet brushless D.C. motor.

The axial air flow set up as a rotor of this construction spins can have an effective cooling action on the stator windings and on the components of the control circuitry connected to the motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
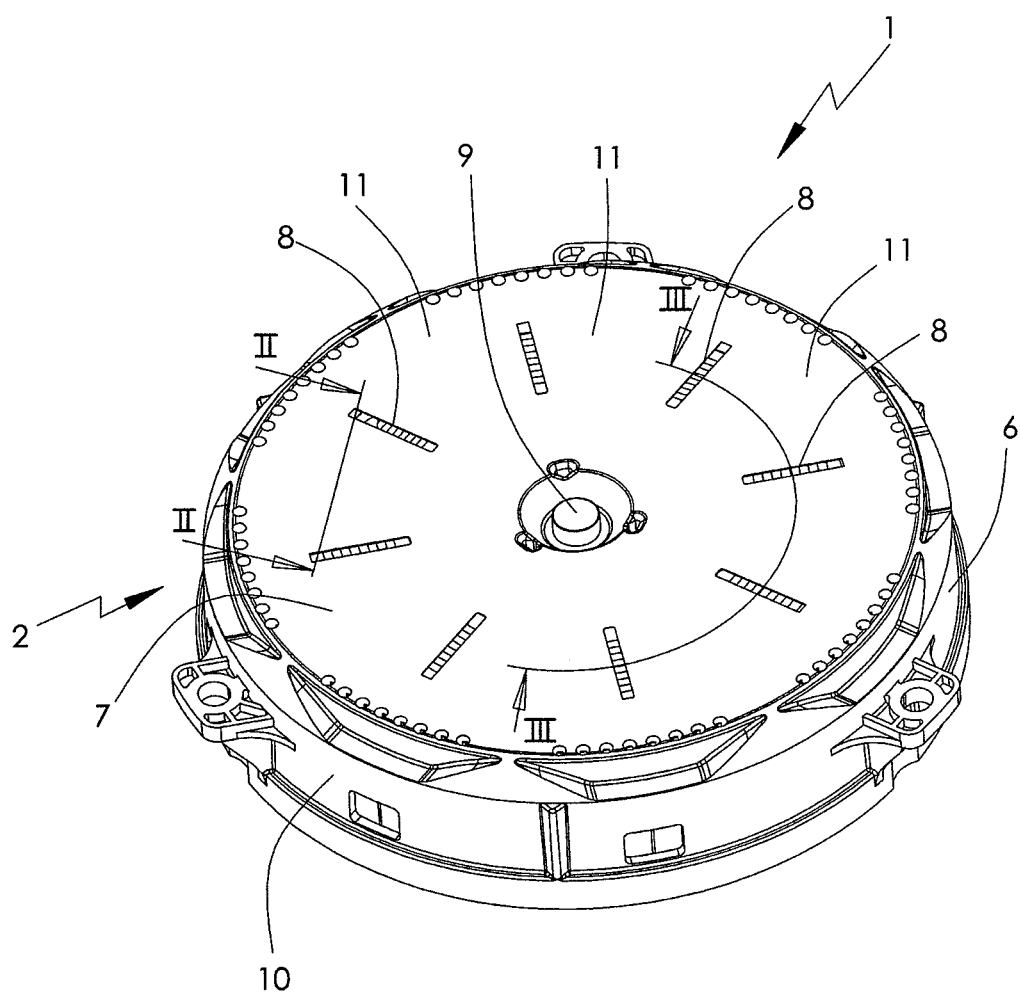
FIG. 1 is a perspective view of an electric brushless direct-current motor comprising a permanent magnet rotor according to the present invention.
Figure 2:
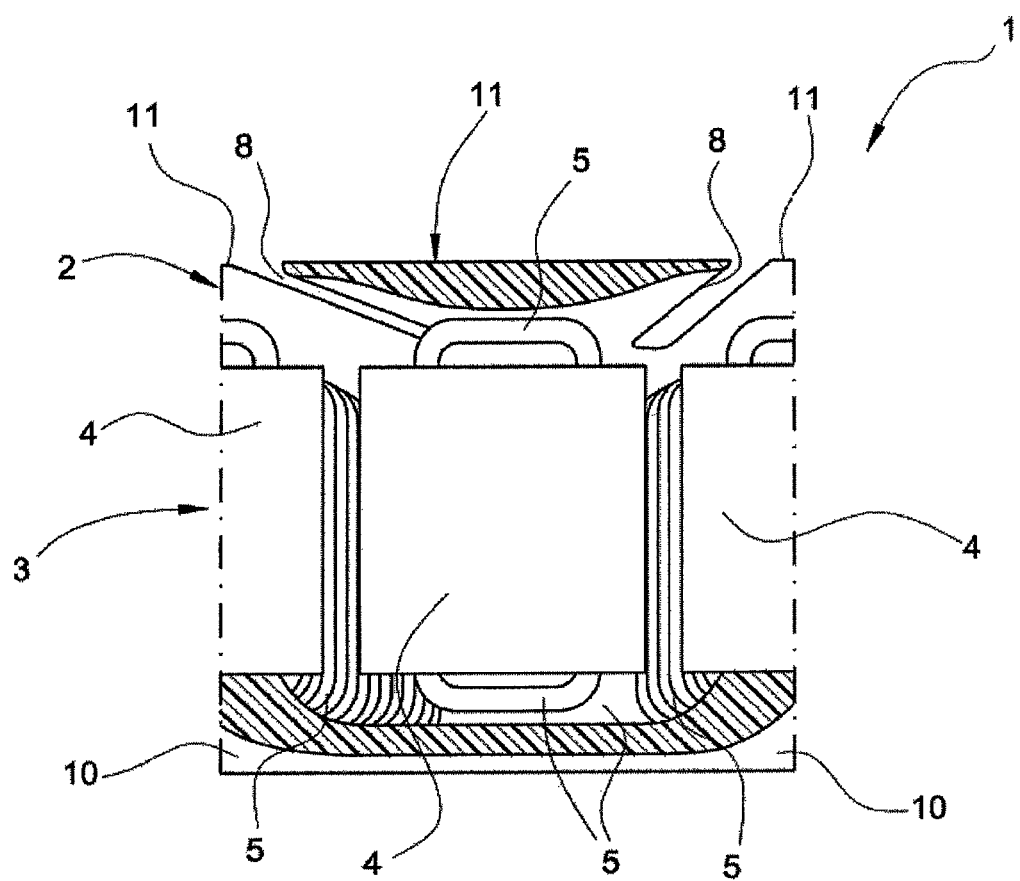
FIG. 2 is a partial cross-section on II-II as marked in FIG. 1.

In FIGS. 1 and 2, reference 1 is a general reference for an brushless D.C. motor. In a manner known per se, the motor 1 comprises a rotor 2 and a stator 3 (FIG. 2).

In a manner also known per se, the stator 3 comprises a magnetic field conducting structure, which in the embodiment illustrated by way of example comprises a plurality of radial expansions or teeth 4, around each of which a coil 5 is wound.

The rotor 2 comprises a carrier structure 6 made of molded plastic. This structure 6 includes an essentially disc-shaped portion 7, which has a plurality of essentially radial slots 8 arranged at equal angular intervals. The carrier structure 6 is overmolded on a central hub or shaft 9 (FIG. 1) which extends from the disc portion 7, coaxially with the stator 3. The periphery of the disc portion 7 of the rotor 2 is formed in one piece with an essentially cylindrical skirt 10 that extends coaxially around the hub 9 and around the stator 3.

In the disc portion 7 of the rotor 2, between pairs of consecutive slots 8, corresponding spokes 11 are defined, their width increasing radially from the centre towards the periphery of the rotor. The spokes 11 have, in a circumferential direction, a transverse cross-section shaped, for example as seen in FIG. 2, in a manner such as to induce, when the rotor 2 rotates in at least one sense, an at least approximately axial air flow through the slots 8.

Figure 3:
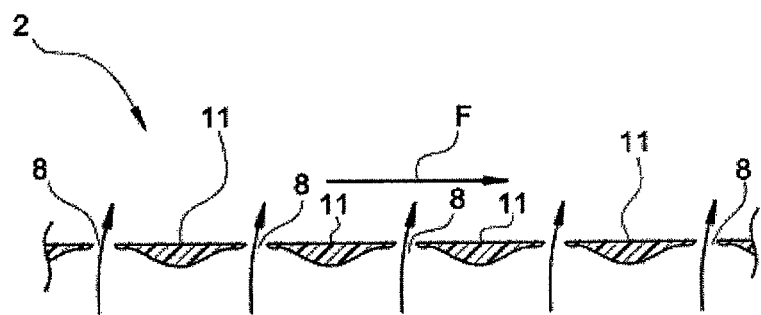
FIG. 3 is a schematic view, essentially in section on III-III as marked in FIG. 1, and shows a first embodiment of the spokes at the central portion of a rotor according to the invention.

In the embodiment shown by way of example in FIGS. 2 and 3 the spokes 11 of the rotor 2 have, in a circumferential direction, a transverse cross-section having an external surface (above in said figures) that is essentially planar, and an internal surface (below in the figures) which has a symmetrical profile which, proceeding from one end of the spoke to the other, is first concave, then convex, and then once again concave, like a double-wing profile.

When a rotor 2 of this construction rotates, in either direction, it draws an air flow from the region inside it to the region outside it, as indicated by the arrows in FIG. 3, which refer to a situation in which the rotor 2 is rotating in the direction of the arrow F as marked.

Figure 4:
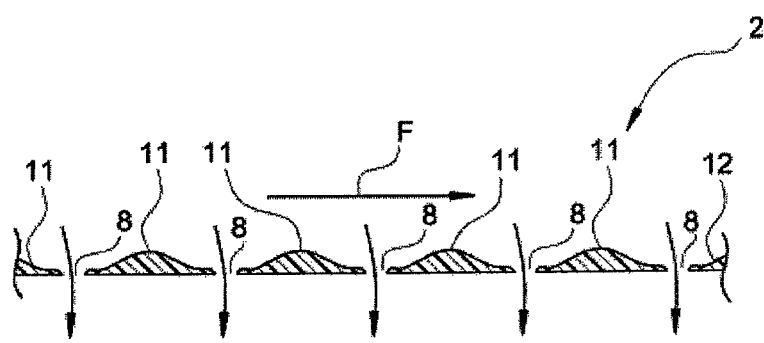
FIGS. 4 and 5 are schematic cross-sections, similar to that presented in FIG. 3, and show two alternative embodiments.

FIG. 4 illustrates an alternative embodiment in which the spokes 11 of the rotor 2 have, in a circumferential direction, a transverse cross-section having an essentially planar internal surface (below) and an external surface (above) which has a symmetrical profile which, proceeding from one end of the individual spoke to the other, is first concave, then convex, and then once again concave, like a double-wing profile disposed upside down. In the alternative of FIG. 4, rotation of the rotor 2 in either direction will always generate an air flow in a generally axial direction (that is, parallel to the rotor axis), from the region outside the rotor to the region inside it, as shown symbolically by the arrows in FIG. 4, which relate to a scenario in which the rotor is rotating in the direction of the arrow F.

Figure 5:
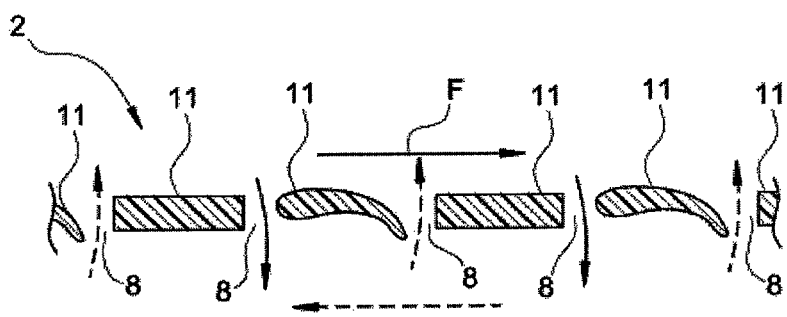

In another alternative embodiment, shown diagrammatically in FIG. 5, the spokes of the rotor 11 have, in a circumferential direction, alternately an aerodynamically inactive cross-section and an aerodynamically active cross-section. In particular, in the embodiment illustrated the aerodynamically inactive spokes 11 have an essentially rectangular cross-section, while the aerodynamically active spokes 11 have crescent shape cross-sections, all oriented in the same way. In this embodiment, the aerodynamic behavior of the rotor 2 is different depending on whether it is rotated in one direction or the opposite direction. When the rotor is rotating in one direction it tends to induce a generally axial air flow through at least some of its slots 8 from the region outside the rotor to the region inside it. When the rotor 2 is rotating in the opposite direction, it tends to induce a generally axial air flow, this time from the region inside it to the region outside it.

The cross-sections shown by way of example in FIGS. 3 to 5 of the appended drawings are not the only cross-sections that could be advantageously adopted in a rotor according to the present invention.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A rotor for an electric motor of the type with an internal stator, the rotor comprising a carrier structure including a disc portion to which is centrally connected a shaft, and the periphery of the disc portion is joined to an essentially cylindrical annular skirt portion which in use extends coaxially around the stator;

wherein the disc portion of the carrier structure has a plurality of slots between which there is defined a corresponding plurality of spokes, at least some of the spokes have, in a circumferential direction, a transverse cross-section shaped in a manner such to induce, at least when the rotor rotates in one direction, an at least approximately axial air flow through corresponding slots, the transverse cross-section has an internal or external surface which has a plurality of arc surface sections with different curvature, the arc surface sections extending continuously in a circumferential direction of the disc portion, adjacent arc surface sections of each transverse cross-section being connected together continuously.

2. The rotor of claim 1, wherein the slots of the disc portion are essentially radial.

3. The rotor of claim 1, wherein at least some of the spokes have, in the circumferential direction, a transverse cross-section having an essentially planar external surface, and an internal surface which has a symmetrical profile which, proceeding in the circumferential direction from one end to the other, is concave, then convex, then once again concave, like a double-wing profile which has a greater thickness at the middle thereof and a less thickness at opposite ends thereof.

4. The rotor of claim 1, wherein at least some of the spokes have, in the circumferential direction, a transverse cross-section having an essentially planar internal surface, and an external surface which has a symmetrical profile which, proceeding in the circumferential direction from one end to the other, is concave, then convex, then once again concave, essentially like a double-wing profile disposed upside down, the double-wing profile having a greater thickness at the middle thereof and a less thickness at opposite ends thereof.

5. The rotor of claim 1, wherein the spokes have, in a circumferential direction, alternately an aerodynamically inactive cross-section and an aerodynamically active cross-section, wherein the spokes having, in a circumferential direction, an aerodynamically active cross-section, which are shaped in a manner such that when the rotor is rotated in one direction the air flows through corresponding slots from the region outside the rotor to the region inside it and when the rotor is rotated in the opposite direction the air flows through the corresponding slots from the region inside the rotor to the region outside it.

6. The rotor of claim 5, wherein the spokes having, in a circumferential direction, an aerodynamically active cross-section, have transverse-sections shaped as wing profiles with portions axially bent in the same orientation, the distal ends of the bent portions being inclined relative to an axial direction of the rotor.

7. The rotor of claim 5, wherein the spokes having, in a circumferential direction, an aerodynamically active cross-section, have crescent shaped transverse-sections.

8. An electric motor having an inner stator and the rotor of claim 1.

9. The motor of claim 8, wherein the motor is a permanent magnet brushless D.C. motor.

10. The rotor of claim 6, wherein a thickness of the bent portions is reduced gradually in a direction toward the distal ends.

11. The rotor of claim 1, wherein adjacent arc surface sections of each transverse cross-section are connected together without any points of discontinuity.

* * * * *